United States Patent [19]
Hull et al.

[11] Patent Number: 5,694,067
[45] Date of Patent: Dec. 2, 1997

[54] MICROCONTROLLER HAVING A MINIMAL NUMBER OF EXTERNAL COMPONENTS

[75] Inventors: Richard L. Hull, Chandler; Gregory C. Bingham, Gilbert; Scott R. Fink, Glendale; James Clark Rogers, Phoenix; Ryan Scott Ellison, Chandler, all of Ariz.

[73] Assignee: Microchip Technology Incorporated, Chandler, Ariz.

[21] Appl. No.: 644,918

[22] Filed: May 24, 1996

[51] Int. Cl.$^6$ .................................... H03L 7/00
[52] U.S. Cl. ................ 327/143; 327/309; 327/321; 327/333; 327/565
[58] Field of Search ........................... 327/143, 309, 327/321, 333, 565–6

[56] References Cited

FOREIGN PATENT DOCUMENTS

403284122  12/1991  Japan ................... 327/143
094024762  10/1994  WIPO ................... 327/143

*Primary Examiner*—Margaret Rose Wambach
*Attorney, Agent, or Firm*—Harry M. Weiss; Jeffrey D. Moy; Harry M. Weiss & Associates, P.C.

[57] ABSTRACT

The present invention relates to a microcontroller that may be configured to operate without the accompaniment of any external components. The microcontroller can function in a proper manner from the application of only power and signal lines with no external components required. The microcontroller has integrated internal reset and oscillator circuitry into the microcontroller. The microcontroller has also integrated simple external components such as current limiting resistors and pull u and pull down resistor into the microcontroller in order to avoid application specific external components.

17 Claims, 4 Drawing Sheets

MICROCONTROLLER HAVING A MINIMAL NUMBER OF EXTERNAL COMPONENTS

RELATED APPLICATIONS

This patent application is related to U.S. patent application entitled "ACCURATE RC OSCILLATOR," having a application Ser. No. 08/499,602 now U.S. Pat. No. 5,565,819 and a filing data of Jul. 7, 1995, in the name of Russell E. Cooper as inventor, and assigned to the same assignee, and U.S. patent application entitled "INTEGRATED CIRCUIT PINS CONFIGURABLE AS A CLOCK INPUT PIN OR AS AN I/O PIN AND AS A DEVICE RESET PIN OR AS AN I/O PIN AND METHOD THEREFORE" in the name of Hull Et Al. as inventor, and assigned to the same assignee as this Application. The disclosures of the above referenced applications are hereby incorporated by reference into this application.

BACKGROUND OF THE INVENTION

1. Field of the Invention

This invention relates to microcontrollers and, more specifically, to a microcontroller that can operate from the application of only a power line and signal lines with no external components. The external components required for the microcontroller to operate properly being integrated internally to the microcontroller.

2. Description of the Prior Art

In order for most microcontrollers to function properly, external circuitry must be coupled to a plurality of different pins on the microcontroller. For example, a clock input pin on a microcontroller would need to be coupled to an external crystal oscillator or a resistor-capacitor (RC) network in order to provide a clock signal to internal components of the microcontroller. The device reset pin is generally coupled to a plurality of different detectors which monitor the operating conditions of the microcontroller. If one of the detectors monitor a condition that requires a device reset, a signal is generated and sent to the reset pin in order to reset certain internal components of the microcontroller. Microcontroller Input/Output (I/O) pins are also coupled to external circuitry. Current limiting resistors and external pull up and pull down resistors are generally coupled to the I/O pins in order to control the signals being transferred to and from the I/O pins.

The problem with using external components with the microcontroller is that is increases system cost. Therefore, a need existed to provide a microcontroller that could function with a minimal number of external components. The microcontroller would integrate internal reset and oscillator circuitry into the microcontroller. The microcontroller would also integrate simple components such as current limiting resistors and pull up and pull down resistors into the microcontroller in order to avoid application specific external components.

SUMMARY OF THE INVENTION

In accordance with one embodiment of the present invention, it is an object of the present invention to provide a microcontroller that could function with a minimal number of external components.

It is another object of the present invention to provide a microcontroller that integrates internal reset and oscillatory circuitry into the microcontroller.

It is still another object of the present invention to provide a microcontroller that integrates simple components such as current limiting resistors and pull up and pull down resistors into the microcontroller to avoid application specific external components.

BRIEF DESCRIPTION OF THE PREFERRED EMBODIMENTS

In accordance with one embodiment of the present invention a microcontroller that can operate with a minimal number of external components is disclosed. The microcontroller is comprised of power supply means coupled to a power pin of the microcontroller for supplying a source of power for the microcontroller to operate. Grounding means are coupled to a ground pin of the microcontroller in order to provide a source of ground for the microcontroller. Oscillator means are provided internal to the microcontroller for supplying a clock signal to internal components of the microcontroller that require a clock signal to function. Reset means are provided internal to the microcontroller for sending a reset signal to internal components of the microcontroller when the microcontroller needs to be reset. Resistor means are provided internal to the microcontroller and coupled to I/O pins of the microcontroller for limiting a signal transferred to and from the I/O pins and for holding signals transferred to and from the I/O pins at a desired level.

The foregoing and other objects, features, and advantages of the invention will be apparent from the following, more particular, description of the preferred embodiments of the invention, as illustrated in the accompanying drawing.

DETAILED DESCRIPTION OF THE PREFERRED EMBODIMENT

Figure 1:
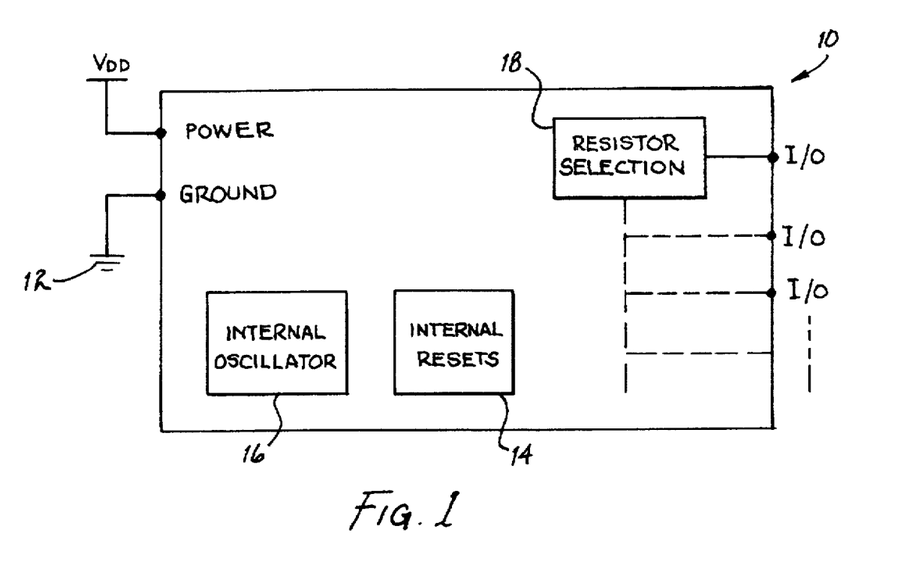
FIG. 1 shows a simplified block diagram of a microprocessor that may function with a minimal number of external components.

Referring to FIG. 1, a microcontroller that may operate with a minimal number of external components 10 (hereinafter microcontroller 10) is shown. The microcontroller 10 is able to operate with only signal lines going to individual pins on the microcontroller 10 and a power supply $V_{DD}$ providing power to the microcontroller 10. The microcontroller 10 may also need to be coupled to a ground source 12 in order to function in a proper manner.

The microcontroller 10 has integrated simple external components internally to the microcontroller 10 in order to reduce system cost. As can be seen from FIG. 1, the microprocessor 10 has integrated internal reset circuitry 14 and oscillator circuitry 16 into the microcontroller 10. The microcontroller 10 has even integrated simple components such as resistor circuitry 18 (i.e., current limiting resistors and pull up and pull down resistors) in order to eliminate application specific external components.

Figure 2:
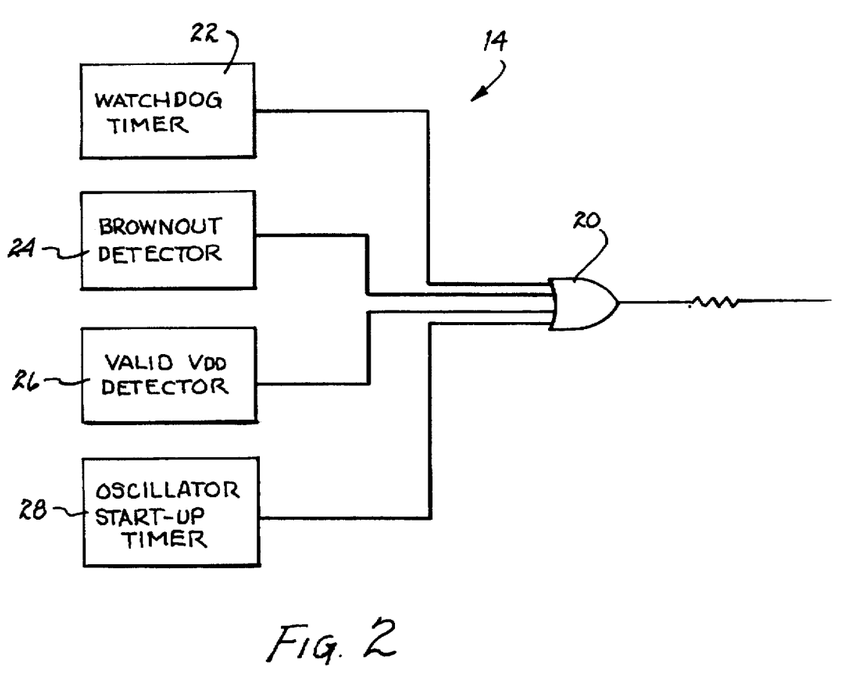
FIG. 2 shows a simplified functional block diagram of an internal reset circuit used in the microprocessor depicted in FIG. 1.

Referring to FIG. 2, the internal reset circuitry 14 is shown. The internal reset circuitry 14 is used for sending a signal to reset internal components of the microcontroller 10 when the microcontroller 10 is in a condition that requires the microcontroller 10 to be reset. The internal reset circuitry 14 is comprised of an OR gate 20. The OR gate is used for sending a signal to reset internal components of the microcontroller 10. A watchdog timer 22 is coupled to an input of the OR gate 20. The watchdog timer 22 is a free running internal timer which does not require any external components. The purpose of the watchdog timer 22 is to guard against program "runaway" where the program is no longer executing as desired. Firmware in the microcontroller 10 must communicate with the watchdog timer 22, continually clearing the watchdog timer 22 before a predetermined timer period has expired. If the watchdog timer 22 is not cleared before the predetermined time period elapses, the watchdog timer 22 will signal the OR gate 20 to initiate a reset of the microcontroller 10. Watchdog timers 22 are known to those skilled in the art. Therefore, the exact circuitry of the watchdog timer 22 will not be discussed in detail.

A brownout detector circuit 24 is also coupled to an input of the OR gate 20. The brownout detector circuit 24 monitors the power supply voltage $V_{DD}$ to the microcontroller 10. If the power to the microcontroller 10 falls below a minimum threshold value that is not zero, and then returns to a valid operating voltage, the brownout detector circuit 24 will send a signal to the OR gate 20 to reset the microcontroller 14. Brownout detector circuits 24 are known to those skilled in the art. Therefore, the exact circuitry of the brownout detector circuit 24 will not be discussed in detail.

A valid $V_{DD}$ detector circuit 26 is also coupled to an input of the OR gate 20. The valid $V_{DD}$ detector circuit 26 will signal the OR gate 20 to hold the microcontroller 10 in a reset mode until the power supply $V_{DD}$ is high enough so that the microcontroller 10 may operate in a proper manner. The valid $V_{DD}$ detector circuit 26 will monitor a rising (previously invalid) $V_{DD}$ and will signal the OR gate 20 to come out of the reset mode only after the valid $V_{DD}$ detector circuit 26 has measured a voltage sufficient enough to operate the microcontroller 10. Valid $V_{DD}$ detector circuits 26 are known to those skilled in the art. Therefore, the exact circuitry of a valid $V_{DD}$ detector circuit 26 will not be discussed in detail.

An oscillator start-up timer circuit 28 is also coupled to an input of the OR gate 20. The oscillator start-up timer circuit 28 will send a signal to the OR gate 20 to hold the microcontroller 10 in a reset mode until a predetermined amount of time has elapsed or a predetermined number of system clock pulses has occurred. The oscillator start-up timer circuit 28 is need in order to give the microcontroller clock time to stabilize. The microcontroller clock needs time to stabilize since crystal oscillators and ceramic resonator circuits do not have instantaneous start-up times. Oscillator start-up timer circuits 28 are known to those skilled in the art. Therefore, the exact circuitry of an oscillator start-up timer circuit 28 will not be discussed in detail.

Figures 3, 3A, 3B:
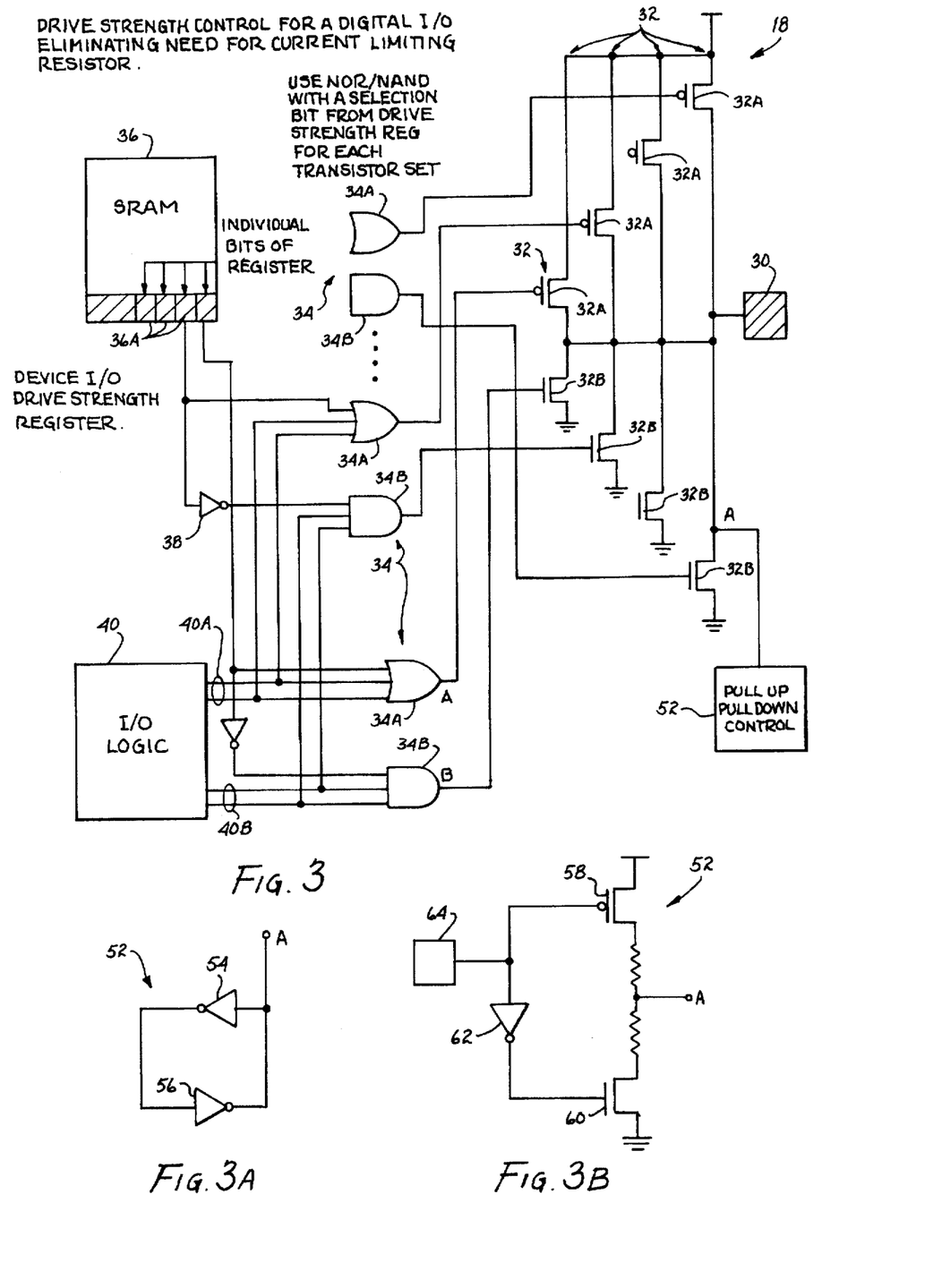
FIG. 3 shows a simplified functional block diagram of an internal resistor circuit used in the microprocessor depicted in FIG. 1.
FIG. 3A shows a simplified functional block diagram of one embodiment of the pull up pull down unit used in the internal resistor circuit depicted in FIG. 3.
FIG. 3B shows a simplified functional block diagram of another embodiment of the pull up pull down unit used in the internal resistor circuit depicted in FIG. 3.

Referring to FIG. 3, resistor circuitry 18 is shown in detail. The resistor circuitry 18 is coupled to an I/O pin 30 of the microcontroller 10. The resistor circuitry 18 is comprised of a plurality of transistor sets 32 which are coupled to the I/O pin 30. The transistor sets 32 are used for altering a strength of resistance to limit a signal transferred to and from the I/O pin 30. Each transistor set is comprised of a PMOS transistor 32A which is coupled to an NMOS transistor 32B.

A plurality of logic gate circuits 34 are provided wherein an individual logic gate circuit 34 is coupled to an individual transistor set 32. Each logic gate circuit 34 is used for sending signals to activate and deactivate a corresponding transistor set 32. Each logic gate circuit 34 is comprised of an OR gate 34A and an AND gate 34B A data storage register 36 is provided for storing data indicating a desired strength of resistance. The resistance level being used to limit the strength of a signal being transferred to and from the I/O pin 30. The data storage register 36 is comprised of a plurality of storage bits 36A. Each storage bit 36A is coupled to a single OR gate 34A and to an input of an inverter 38. The output of the inverter 38 further being coupled to an input of a single AND gate 34B. The data stored in each storage bit 36A of the data storage register 36 will be used to signal an individual logic gate circuit 34 whether to activate or deactivate a corresponding transistor set 32.

Input/Output (I/O) logic 40 is provided for writing data out of the I/O pin 30 and for reading data in from the I/O pin 30. The I/O logic 40 has one set of outputs 40A which are coupled to each OR gate 34A and another set of outputs 40B which are coupled to each AND gate 34B.

Figure 3C:
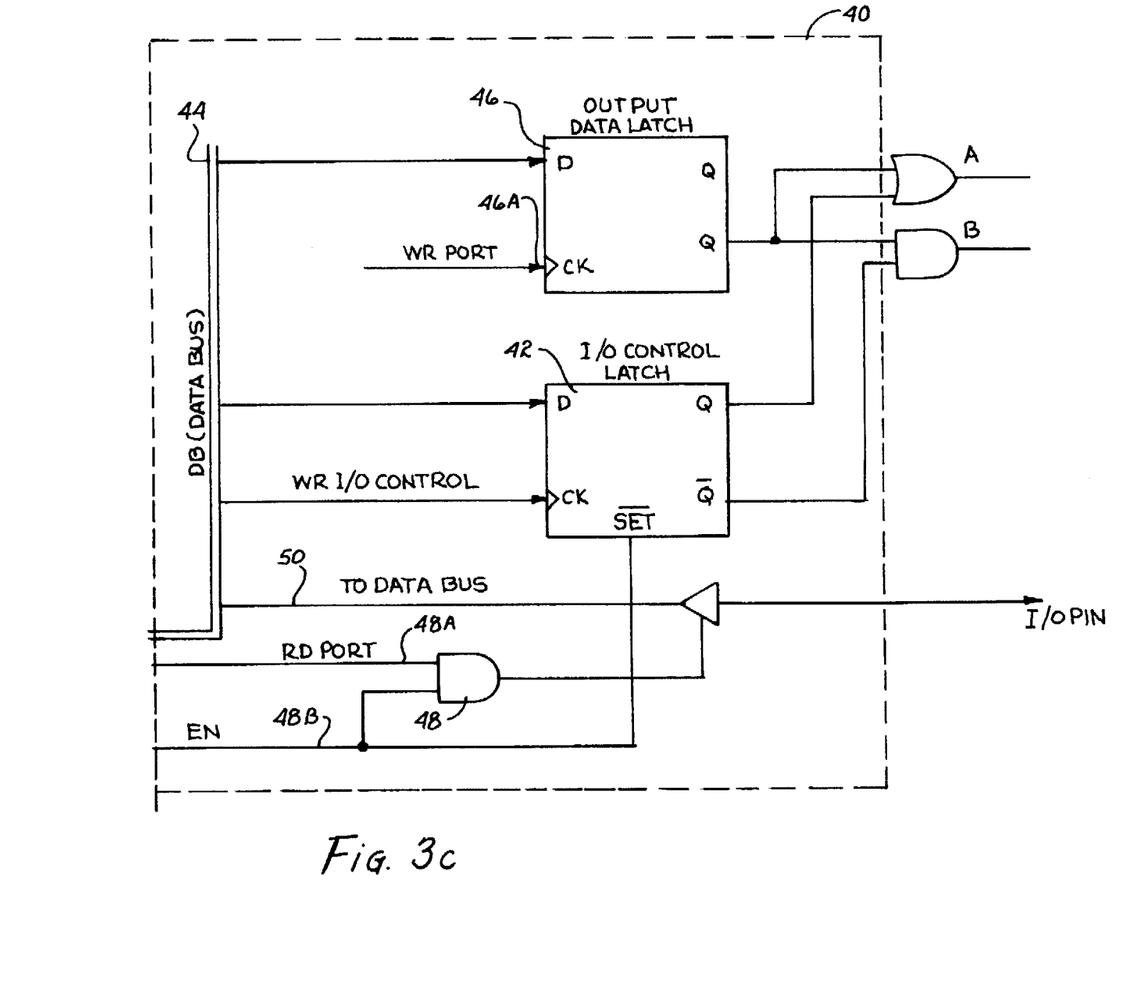
FIG. 3C is a simplified functional block diagram of the I/O logic used in the internal resistor circuit depicted in FIG. 3.

Referring to FIG. 3C, a simplified functional block diagram of the I/O logic 40 is shown. The I/O logic 40 is comprised of an I/O control latch 42. The I/O control latch 40 is coupled to a data bus 44 for setting the I/O pin 30 (FIG. 3) as an input pin (i.e., read data in from the I/O pin 30 Q=1) or as an output pine (i.e., write data out of the I/O pine 30, Q=0). An output data latch 46 is also coupled to the data bus 44. The output data latch 46 is used for clocking in data from the data bus 44 to be written out of the I/O pin 30 when the I/O pin 30 is configured as an output pin. An AND gate 48 is provided in order for the I/O logic 40 to signal the I/O pin 30 to read data from the I/O pin 30. When a read signal 48A and an enable I/O logic signal 48B are inputted to the AND gate 48 data may be transferred directly from the I/O pin 30 to the data bus 40 through data bus line 50 if the I/O pin 30 is configured as an input pin.

As stated above, the I/O logic 40 is coupled to each logic gate circuit 34. Each OR gate 34A of each logic gate circuit 34 has an input coupled to an inverted output Q of the output data latch 46 and another input coupled to an output Q of the I/O control latch 42. Each AND gate 34B of each logic gate circuit 34 has an input coupled to the inverted output Q of the output data latch 46 and another input coupled to an inverted output Q of the I/O control latch 42. In order to write data to the I/O pin 30, the I/O control latch 42 must set the I/O pin 30 as an output pin (Q=0). The output latch 46 will then clock in the data to be transfer from the data bus 20 through the WR PORT 46A.

Referring back to FIG. 3, a pull up pull down resistor control circuit 52 is also provided on the resistor circuitry 18. The pull up pull down resistor control circuit 52 is coupled to the I/O pin 30 and is used for holding signals transferred to and from the I/O pin 30 at a desired level.

Referring to FIG. 3A one embodiment of the pull up pull down resistor control circuit 52 is shown. In this embodiment, the pull up pull down resistor control circuit 52 is comprised of a first inverter 54 having an input coupled to the I/O pin 30. A second inverter 56 is also provided and has an input coupled to an output of the first inverter 54 and an output coupled to the input of the first inverter 54.

Referring to FIG. 3B, another embodiment of the pull up pull down resistor control circuit 52 is shown. In this embodiment, the pull up pull down resistor control circuit 52 is mainly comprised of a PMOS transistor 58 coupled to an NMOS transistor 60. An inverter 62 is provided and has an input coupled to a gate of the PMOS transistor 58 and an output coupled to a gate of the NMOS transistor 60. The input to the inverter 62 is also coupled to pull up control memory bit 64. The pull up control memory bit 64 is used for storing data to control the pull up pull down resistor control circuit 52.

Figure 4:
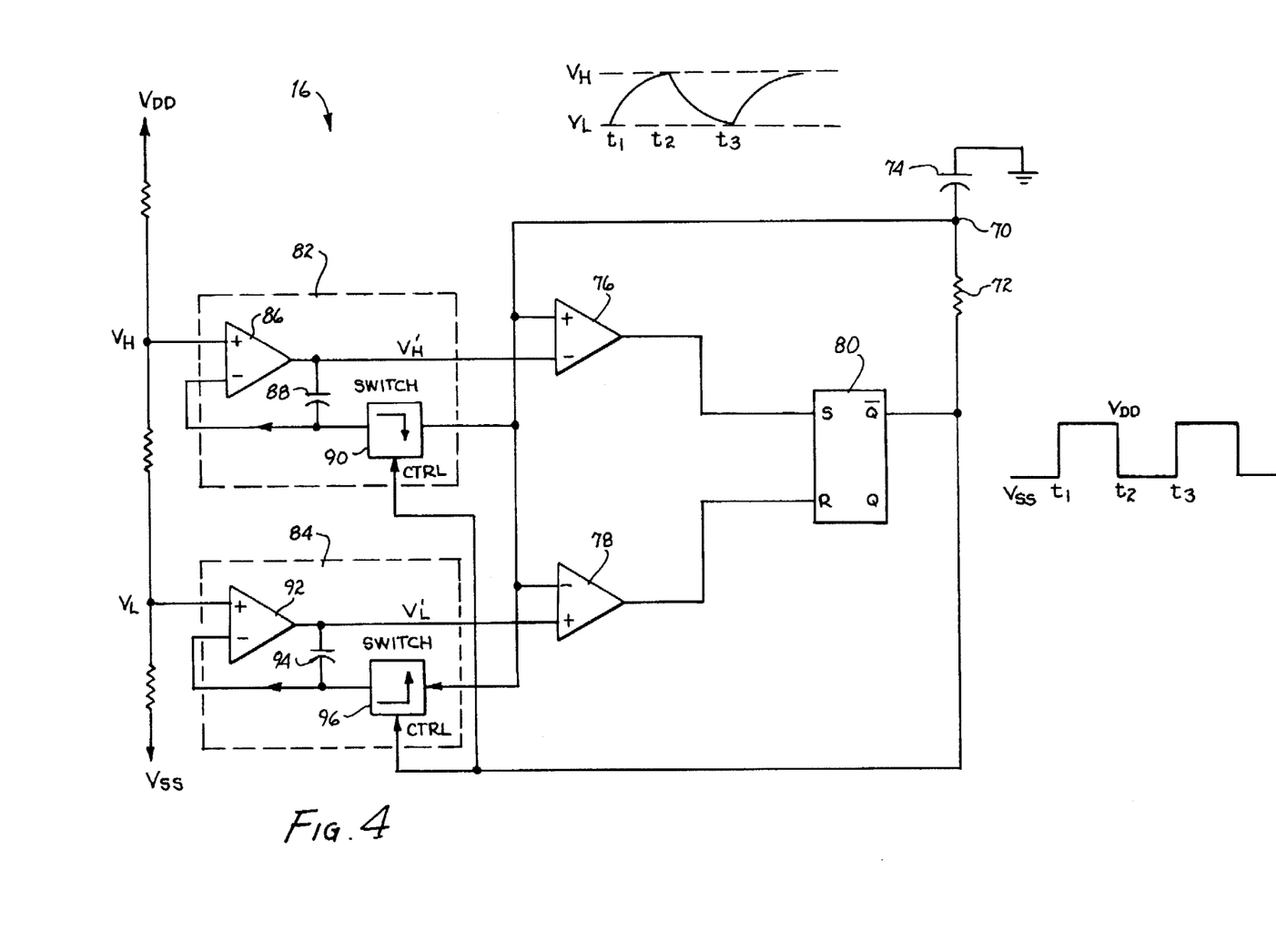
FIG. 4 is a simplified block diagram of the internal oscillator circuit used in the microprocessor depicted in FIG. 1.

Referring to FIG. 4, the internal oscillator circuit 16 is shown in detail. The internal oscillator circuit 16 is a resistor capacitor (RC) oscillator circuit that generates an oscillatory signal of a predetermined frequency by accurately oscillating between precise predetermined voltage levels, for example, predetermined high and low voltage thresholds. The internal oscillator circuit 16 generates an oscillatory signal at node 70 that accurately oscillates between low and high threshold voltage values. The frequency of oscillation is determined by the time constant of the resistor 72 and the capacitor 74 wherein the frequency of oscillation is inversely proportional to the product of resistor 22 and capacitor 14.

Internal oscillator circuit 16 includes comparators 76 and 78 and S/R flip flop 80. Comparators 76 and 78 have outputs respectively coupled to the set and reset inputs of the S/R flip flop 80. Circuit node 70 is coupled to the non-inverting input of the comparator 76 and to the inverting input of the comparator 78. The inverting input of comparator 76 is coupled to receive a modified version of the high threshold voltage $V_H$, as represented by $V'_H$. Likewise, the non-inverting input of comparator 78 is coupled to receive a modified version of the low threshold voltage $V_L$ as represented by $V'_L$.

An inverting output of S/R flip flop 80 is coupled through resistor 72 to circuit node 70. The output of S/R flip flop 80 switches between the supply voltages applied to flip flop 20, for example, between $V_{DD}$ and $V_{SS}$, depending on whether S/R flip flop 80 is being set or reset. For example, when S/R flip flop 80 is set, the inverting output of S/R flip flop 80 switches from a logic 1 to a logic 0 and, thus, transitions from voltage $V_{DD}$ to voltage $V_{SS}$.

Internal oscillator circuit 16 further includes voltage modifying circuits 82 and 84 for respectively generating modified high and low threshold voltages applied to comparators 76 and 78 based upon the overshoot of voltage $V_H$ or undershoot of voltage $V_L$ of the oscillatory signal appearing at circuit node 70 when S/R flip flop 80 switches. In particular, circuit 82 generates and applies a modified voltage $V'_H$ to the inverting input of comparator 76 so that by the time S/R flip flop 80 actually switches in response to the oscillatory signal exceeding modified voltage $V'_H$, the oscillatory signal is substantially equal to the predetermined high threshold voltage $V_H$. Likewise, circuit 84 generates and applies a modified voltage $V'_L$ to the non-inverting input of comparator 78 so that by the time S/R flip flop 80 actually switches in response to the oscillatory signal falling below modified voltage $V'_L$, the oscillatory signal is substantially equal to the predetermined low threshold voltage $V_L$. In this manner, the internal oscillator circuit 16 provides a signal appearing at circuit node 70 that accurately oscillates between voltages $V_L$ and $V_H$. This ensures that the signal at circuit node 70 oscillates at a predetermined and substantially constant frequency.

Voltage modifying circuit 82 includes an amplifier 86 for generating and applying a modified version of the high threshold voltage to comparator 76. Amplifier 86 has a first input coupled to receive high threshold voltage $V_H$. The second input of amplifier 86 is coupled to a first terminal of a capacitor 88, the latter having a second terminal coupled to the output of amplifier 86. The output of amplifier 86 is further coupled to the inverting input of comparator 76. Circuit 82 also includes a switch 90 which is coupled between circuit node 70 and the second input of amplifier 86. The switch 90 also has a control input to the inverting output of S/R flip flop 80.

In a similar manner, voltage modifying circuit 84 includes an amplifier 92 for generating and applying a modified version of the low threshold voltage to comparator 78. Amplifier 92 has a first input coupled to receive low threshold voltage $V_L$. The second input of amplifier 92 is coupled to a first terminal of a capacitor 94, the latter having a second terminal coupled to the output of amplifier 92. The output of amplifier 92 is further coupled to the inverting input of comparator 78. Circuit 84 also includes a switch 96 which is coupled between circuit node 70 and the second input of amplifier 92. The switch 96 also has a control input to the inverting output of S/R flip flop 80.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A microcontroller that can operate with a minimal number of external components comprising, in combination:

power supply means coupled to a power pin of said microcontroller for supplying said microcontroller with a source of power;

grounding means coupled to a ground pin of said microcontroller for providing a source of ground for said microcontroller;

oscillator means internal to said microcontroller for supplying a clock signal to internal components of said microcontroller that require said clock signal to function;

reset means internal to said microcontroller for sending a reset signal to internal components of said microcontroller when said microcontroller needs to be reset; and resistor means internal to said microcontroller and coupled to at least one Input/Output (I/O) pin of said microcontroller for limiting a signal transferred to and from said at least one I/O pin and for holding said signal transferred to and from said at least one I/O pin at a desired level.

2. A microcontroller that can operate with a minimal number of external components in accordance with claim 1 wherein said resistor means are coupled to all I/O pins of said microcontroller.

3. A microcontroller that can operate with a minimal number of external components in accordance with claim 1 wherein said oscillator means generates an oscillatory signal of a predetermined frequency across a series resistor-capacitor (RC) network by ensuring that said oscillatory signal accurately oscillates between first and second voltages generated from a first supply voltage source where the frequency of oscillation is determined by a time constant of said RC network comprising:

a first comparator having a first input coupled to said RC network;

a second comparator having a first input coupled to said RC network;

a flip flop having a first input coupled to an output of said first comparator and a second input coupled to an output of said second comparator and an output coupled to said RC network;

first voltage modifying means for receiving said first voltage and for applying a modified version of said first voltage to a second input of said first comparator, said modified version of said first voltage being equal to said first voltage adjusted by a voltage difference between said first voltage and a voltage of said oscillatory signal at time of switching of said flip flop from a first logic level to a second logic level; and second voltage modifying means for receiving said second voltage and for applying a modified version of said second voltage to a second input of said second comparator, said modified version of said second voltage being equal to said second voltage adjusted by a voltage difference between said second voltage and a voltage of said oscillatory signal at time of switching of said flip flop from said second logic level to said first logic level.

4. A microcontroller that can operate with a minimal number of external components in accordance with claim 3 wherein said first voltage modifying means comprises means for sampling said oscillatory signal upon switching of said flip flop from said first logic level to said second logic level.

5. A microcontroller that can operate with a minimal number of external components in accordance with claim 3 wherein said second voltage modifying means comprises means for sampling said oscillatory signal upon switching of said flip flop from said second logic level to said first logic level.

6. A microcontroller that can operate with a minimal number of external components in accordance with claim 1 wherein said reset means comprises:

logic gate means for outputting a signal to reset internal components of said microcontroller;

watchdog timer means coupled to a first input of said logic gate means for sending a signal to said logic gate means to reset said microcontroller if said watchdog timer is not cleared before a predetermined time period elapses;

brownout detector means coupled to a second input of said logic gate means for sending a signal to said logic gate means to reset said microcontroller when power to said microcontroller falls below a minimum threshold value that is not zero and then returns to a valid operating voltage;

valid $V_{DD}$ detector means coupled to a third input of said logic gate means for sending a signal to said logic gate means to hold said microcontroller in a reset mode until a valid operating voltage is measured; and oscillator start-up timer means coupled to a fourth input of said logic gate means for sending a signal to said logic gate means to hold said microcontroller in said reset mode until at least one of a predetermined time period has elapsed and a predetermined number of clock pulses has occurred.

7. A microcontroller that can operate with a minimal number of external components in accordance with claim 1 wherein said resistor means comprises:

a plurality of transistor set means coupled to said at least one I/O pin for altering a strength of resistance to limit said signal transferred to and from said at least one I/O pin;

a plurality of logic gate circuitry means wherein individual logic gate circuitry means are coupled to individual transistor set means for sending signals to activate desired transistor sets of said plurality of transistor sets;

register means couples to each of said plurality of logic gate circuitry means for storing data on a desired strength of resistance to limit said signal transferred to and from said at least one I/O pin and for signalling said plurality of logic gate circuitry means to activate said desired transistor sets of said plurality of resistor sets;

means coupled to said a last one I/O pin and internal to said microcontroller for holding said signal transferred to and from said at least one I/O pin at a desired level; and I/O logic means coupled to each of said plurality of logic gate circuitry means for writing data out of said at least one I/O pin and for reading data in from said at least one I/O pin.

8. A microcontroller that can operate with a minimal number of external components in accordance with claim 7 wherein said means for holding said signal transferred to and from said at least one I/O pin at a desired level comprises:

a first inverter having an input coupled to said at least one I/O pin; and a second inverter having an input coupled to an output of said first inverter and an output coupled to said input of said first inverter.

9. A microcontroller that can operate with a minimal number of external components in accordance with claim 7 wherein said means for holding said signal transferred to and from said at least one I/O pin at a desired level comprises:

a PMOS transistor;

an NMOS transistor coupled to sand PMOS transistor;

an inverter having an input coupled to a gate of said PMOS transistor and an output coupled to a gate of said NMOS transistor; and memory bit means coupled to said input of said inverter for storing data to activate and deactivate said PMOS and said NMOS transistor.

10. A microcontroller that can operate with a minimal number of external components in accordance with claim 7 wherein each of said transistor set means comprises:

a PMOS transistor, and an NMOS transistor coupled to said PMOS transistor.

11. A microcontroller that can operate with a minimal number of external components in accordance with claim 10 wherein each of said plurality of logic gate circuitry means comprises:

an OR gate having an input coupled to an individual bit of said register means and inputs coupled to said I/O logic means and an output coupled to said PMOS transistor;

an inverter having an input coupled to said individual bit of said register means; and an AND gate having an input coupled to an output of said inverter and inputs coupled to said I/O logic means and an output coupled to said NMOS transistor.

12. A microcontroller that can operate with a minimal number of external components in accordance with claim 7 wherein said I/O logic means comprises:

data bus means for transferring data to and from said at least one I/O pin;

I/O control latch means coupled to said data bus means for sending a signal to set said at least one I/O pin as an input pin and for sending a signal to set said at least one I/O pin as an output pin;

output data latch means coupled to said data bus means for clocking in data from said data bus means to be written out of said at least one I/O pin when said at least one I/O pin is configured as said output pin; and AND gate means having an output coupled to said at least one I/O pin and an input coupled to a read enable signal for signalling said at least one I/O pin to transfer data inputted to said at least one I/O pin to said data bus means when said at least one I/O pin is configured as said input pin.

13. A microcontroller that can operate with a minimal number of external components comprising, in combination:

power supply means coupled to a power pin of said microcontroller for supplying said microcontroller with a source of power;

grounding means coupled to a ground pin of said microcontroller for providing a source of ground for said microcontroller;

oscillator means internal to said microcontroller for supplying a clock signal to internal components of said microcontroller that require said clock signal to function, said oscillator means generates an oscillatory signal of a predetermined frequency across a series resistor-capacitor (RC) network by ensuring that said oscillatory signal accurately oscillates between first and second voltages generated from a first supply voltage source where the frequency of oscillation is determined by a time constant of said RC network comprising:

a first comparator having a first input coupled to said RC network;

a second comparator having a first input coupled to said RC network;

a flip flop having a first input coupled to an output of said first comparator and a second input coupled to an output of said second comparator and an output coupled to said RC network;

first voltage modifying means for receiving said first voltage and for applying a modified version of said first voltage to a second input of said first comparator, said modified version of said first voltage being equal to said first voltage adjusted by a voltage difference between said first voltage and a voltage of said oscillatory signal at time of switching of said flip flop from a first logic level to a second logic level; and second voltage modifying means for receiving said second voltage and for applying a modified version of said second voltage to a second input of said second comparator, said modified version of said second voltage being equal to said second voltage adjusted by a voltage difference between said second voltage and a voltage of said oscillatory signal at time of switching of said flip flop from said second logic level to said first logic level;

reset means internal to said microcontroller for sending a reset signal to internal components of said microcontroller when said microcontroller needs to be reset, said reset means comprising:

logic gate means for outputting a signal to reset internal components of said microcontroller;

watchdog timer means coupled to an input of said logic gate means for sending a signal to said logic gate means to reset said microcontroller if said watchdog timer is not cleared before a predetermined time-out period elapses;

brownout detector means coupled to an input of said logic gate means for sending a signal to said logic gate means to reset said microcontroller when power to said microcontroller falls below a minimum threshold value that is not zero and then returns to a valid operating voltage;

valid $V_{DD}$ detector means coupled to an input of said logic gate means for sending a signal to said logic gate means to hold said microcontroller in a reset mode until a valid operating voltage is measured; and oscillator start-up timer means coupled to an input of said logic gate means for sending a signal to said logic gate means to hold said microcontroller in said reset mode until at least one of a predetermined time period has elapsed and a predetermined number of clock pulses has occurred; and resistor means internal to said microcontroller and coupled to each I/O pin of said microcontroller for limiting a signal transferred to and from said each I/O pin and for holding said signal transferred to and from said each I/O pin at a desired level, said resistor means comprising:

a plurality of transistor set means coupled to said at least one I/O pin for altering a strength of resistance to limit said signal transferred to and from said at least one I/O pin, each of said plurality of transistor sets comprising:

a PMOS transistor; and an NMOS transistor coupled to said PMOS transistor;

a plurality of logic circuitry means wherein individual logic gate circuitry means for coupled to individual transistor set means for sending signals to activate desired transistor sets of said plurality of transistor sets, each of said plurality of logic gate circuitry means comprising:

an OR gate having an input coupled to an individual bit of said register means and inputs coupled to said I/O logic means and an output coupled to said PMOS transistor;

an inverter having an input coupled to said individual bit of said register means; and an AND gate having an input coupled to an output of said inverter and inputs coupled to said I/O logic means and an output coupled to said NMOS transistor;

register means coupled to each of said plurality of logic gate circuitry means for storing data on a desired strength of resistance to limit said signal transferred to and from said at least one I/O pin and for signalling said plurality of logic gate circuitry means to activate said desired transistor sets of said plurality of resistor sets;

means coupled to said a last one I/O pin and internal to said microcontroller for holding said signal transferred to and from said at least one I/O pin at a desired level; and I/O logic means coupled to each of said plurality of logic gate circuitry means for writing data out of said at least one I/O pin and for reading data in from said at least one I/O pin, said I/O logic means comprising:

data bus means for transferring data to and from said at least one I/O pin;

I/O control latch means coupled to said data bus means for sending a signal to set said at least one I/O pin as an input pin and for sending a signal to set said at least one I/O pin as an output pin;

output data latch means coupled to said data bus means for clocking in data from said data bus means to be written out of said at least one I/O pin when said at least one I/O pin is configured as said output pin; and AND gate means having an output coupled to said at least one I/O pin and an input coupled to a read enable signal for signalling said at least one I/O pin to transfer data inputted to said at least one I/O pin to said data bus means when said at least one I/O pin is configured as said input pin.

14. A microcontroller that can operate with a minimal number of external components in accordance with claim 13 wherein said first voltage modifying means comprises means for sampling said oscillatory signal upon switching of said flip flop from said first logic level to said second logic level.

15. A microcontroller that can operate with a minimal number of external components in accordance with claim 13 wherein said second voltage modifying means comprises means for sampling said oscillatory signal upon switching of said flip flop from said second logic level to said first logic level.

16. A microcontroller that can operate with a minimal number of external components in accordance with claim 13 wherein said means for holding said signal transferred to and from said at least one I/O pin at a desired level comprises:

a first inverter having an input coupled to said at least one I/O pin; and a second inverter having an input coupled to an output of said first inverter and an output coupled to said input of said first inverter.

17. A microcontroller that can operate with a minimal number of external components in accordance with claim 13 wherein said means for holding said signal transferred to and from said at least one I/O pin at a desired level comprises:

a PMOS transistor;

an NMOS transistor coupled to said PMOS transistor;

an inverter having an input coupled to a gate of said PMOS transistor and an output coupled to a gate of said NMOS transistor; and memory bit means coupled to said input of said inverter for storing data to activate and deactivate said PMOS and said NMOS transistor.

\* \* \* \* \*